United States Patent
Bhole et al.

(10) Patent No.: US 10,296,540 B1
(45) Date of Patent: May 21, 2019

(54) DETERMINE IMAGE RELEVANCE USING HISTORICAL ACTION DATA

(71) Applicant: A9.com, Inc., Palo Alto, CA (US)

(72) Inventors: Chetan Pitambar Bhole, San Mateo, CA (US); Erick Cantu-Paz, Palo Alto, CA (US); Arnab Sanat Kumar Dhua, Mountain View, CA (US)

(73) Assignee: A9.com, Inc., Palo Alto, CA (US)

( * ) Notice: Subject to any disclaimer, the term of this patent is extended or adjusted under 35 U.S.C. 154(b) by 231 days.

(21) Appl. No.: 15/259,985

(22) Filed: Sep. 8, 2016

(51) Int. Cl.
   *G06F 17/30* (2006.01)
   *G06F 16/58* (2019.01)
   *G06F 16/51* (2019.01)
   *G06F 16/9535* (2019.01)
   *G06F 16/2457* (2019.01)

(52) U.S. Cl.
   CPC .... *G06F 16/5866* (2019.01); *G06F 16/24578* (2019.01); *G06F 16/51* (2019.01); *G06F 16/9535* (2019.01); *G06F 17/3028* (2013.01); *G06F 17/3053* (2013.01); *G06F 17/30268* (2013.01); *G06F 17/30867* (2013.01)

(58) Field of Classification Search
   None
   See application file for complete search history.

(56) References Cited

U.S. PATENT DOCUMENTS 9,229,956 B2 * 1/2016 Ke .................... G06F 17/30256

* cited by examiner

*Primary Examiner* — Belix M Ortiz Ditren
(74) *Attorney, Agent, or Firm* — Hogan Lovells US LLP

(57) ABSTRACT

The selection of content to present to a user can be based at least in part upon probabilities of the user selecting to view more information and/or entering into a transaction with respect to instances of the content. For example, user behavior with respect to various queries provided through a content provider can be determined in order to calculate a probability that a user was searching for a particular image. The user behavior can include historical action data, such as information that indicates images associated with an action (e.g., selected, purchased, etc.) in response to a particular image search. The historical action data can be analyzed to generate an index that indicates a likelihood that the search was intended for a particular image. Once an image query is received, items of interest can be determined using the index, and those images and associated content can be presented to the user.

20 Claims, 8 Drawing Sheets

DETERMINE IMAGE RELEVANCE USING HISTORICAL ACTION DATA

BACKGROUND

Users are increasingly utilizing electronic devices to research, locate, and obtain various types of information. For example, users may utilize a search engine to locate information about various items, such as items offered through an electronic marketplace. Some search approaches use similarity of different portions of an image to identify images and items that match features of the image. However, these approaches can be computationally intensive and may require substantial resources and/or time to implement. Further, these search approaches do not always present items and images that are of interest to the user.

BRIEF DESCRIPTION OF THE DRAWINGS

Various embodiments in accordance with the present disclosure will be described with reference to the drawings, in which.

DETAILED DESCRIPTION

Figure 1:
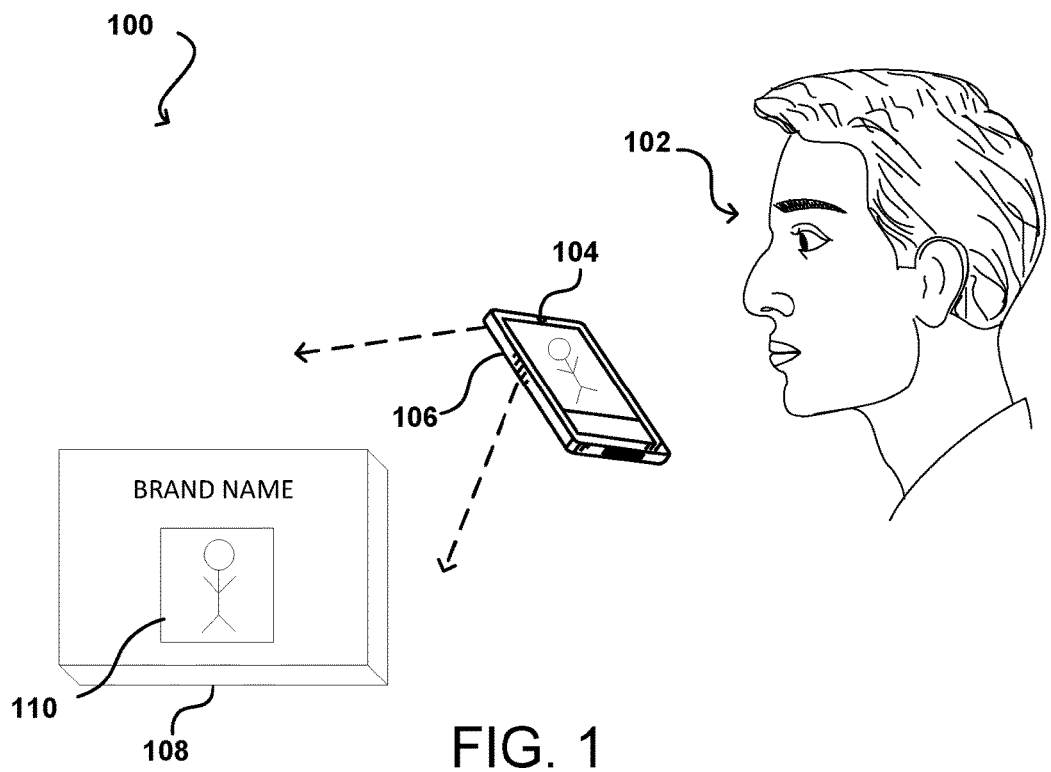
FIGS. 1-3 illustrate example image search results for various items that can be presented to a user in accordance with various embodiments.

Systems and methods in accordance with various embodiments of the present disclosure may overcome one or more of the aforementioned and other deficiencies experienced in conventional approaches to determining content to provide to a user. In particular, various embodiments attempt to determine the images and corresponding items to display to a user in response to an image search query. Embodiments track and use actions such as clicks, cart adds, purchases, video consumption, etc., based on matching image search results of an image query in order to improve image retrieval and relevancy determinations. Once these behavioral features are generated, image ranking models can be generated that incorporate the behavioral features as well as traditional term frequency inverse document frequency features in a machine learning framework. Thus, embodiments may implement multiple ranking processes and weight the impact of the various image matching results using machine learning models. Accordingly, images may be matched using traditional feature extraction and comparison techniques while also incorporating the historical action data of users interacting with the content provider.

For example, user behavior with respect to various images and their corresponding items provided through an electronic marketplace can be determined in order to calculate a probability that a user was searching for a particular image in response to an image query. The user behavior can include historical action data, such as information that indicates images that were selected in response to a particular image search and/or images associated with items that were purchased in response to a particular image search. The historical action data can be analyzed to generate an index that maps visual words associated with image searches to one or more images that were selected and images associated with items that were purchased in response to the image query. Additionally, the index can include image selection probabilities and visual word probabilities for each visual word associated with a given image that indicate the likelihood that an image is relevant to a subsequent image search. Moreover, the historical data can be used to train image ranking models that can include multiple different ranking functions and can be used to determine a probability of interest for matching images for a given image search.

In accordance with various embodiments, such approaches allow for providing images that are more relevant to an image query of the user such that the user will be more likely to view the images and/or purchase items associated with the images, in order to improve the user experience and help the user more quickly locate items of interest. In addition to providing images responsive to a query, such an approach can improve the user experience by enabling the user to instantly obtain information for multiple images and items that are likely to be of interest to the user upon accessing a website or other grouping of content, improving the user's overall impression of that site. In addition to improving the user experience, showing items that are more likely to result in views and/or transactions can reduce the system traffic and/or processing requirements of the provider as more effective search results will lead to fewer additional searches and/or refinement searches being necessary to obtain the same information. As additional data for is gathered, such as through users selecting and/or purchasing items in response to a particular image query, the index and image ranking models can be updated accordingly. The updated index and/or image ranking models can be used to determine the items to present to a user, and the arrangement of those items, which can improve the overall user experience and improve the effectiveness of image-based searching.

Various other functions and advantages are described and suggested below as may be provided in accordance with the various embodiments.

FIG. 1 illustrates an example search environment 100 that can be presented in accordance with various embodiments. User 102 can use computing device 104 to search for items through a search service. Using an appropriate application executing on computing device 104, the user is able to choose a type of search to perform (e.g., an image search) to obtain a list of matching items. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, and portable media players, among others.

As shown in FIG. 1, user 102 can use an image capture device built in to computing device 104 to take a picture 106 of an object 108. For example, user 102 may not know the terms to use to identify the object, a brand associated with the object, and/or user 102 may not know the name of the object or the object may be difficult to describe. For instance, user 102 may desire to know other products that are available associated with a particular brand, sub-brand, and/or type of product without knowing how to describe the object to search. In some embodiments, a user 102 may capture a picture of a portion 110 of the object 108. For example, a portion 110 may include a picture of a brand, trademark, or logo associated with an object 108 and/or the packaging associated with an object 108.

Figure 2:
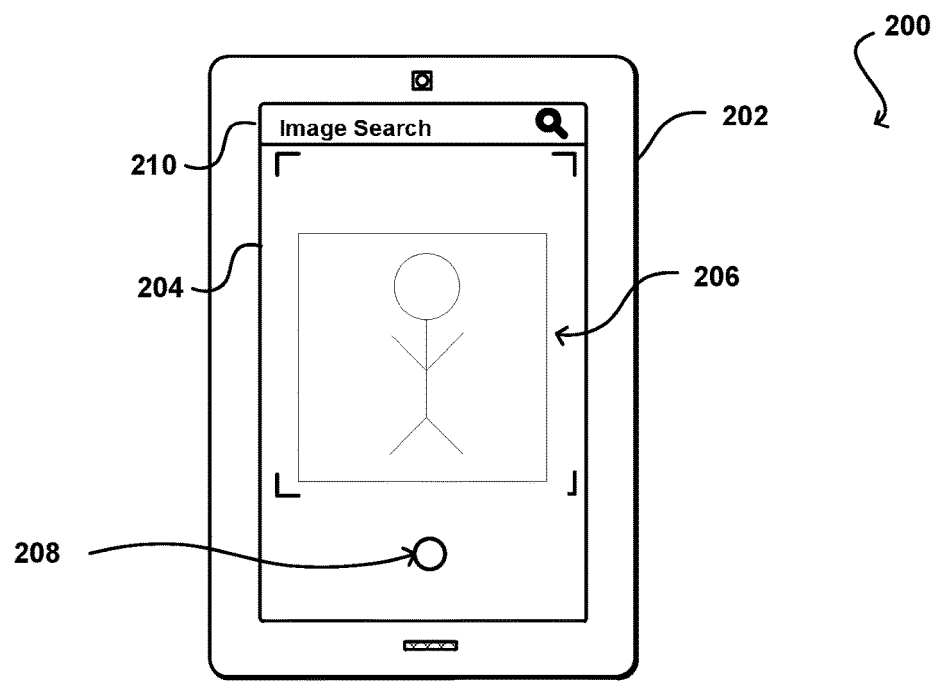

FIG. 2 illustrates an example search interface display 200 that can be presented in accordance with various embodiments. As shown in FIG. 2, search interface display 200 on computing device 202 can include an indicator associated with an image search (e.g., image search indicator 210) in which the user may begin a search by capturing an image associated with an object 108 in which they desire to find related products or content. When the user 102 selects an image search option in a search application on the computing device 202, the user 102 can be instructed to take a picture of an object 108 using an image capture device built into computing device 202. In some embodiments, the user 108 can upload an image previously captured or downloaded from a source other than the image capture device. As discussed further below, the image 206 can be analyzed to determine one or more features that may be used to match products and/or images stored by the provider and obtain search results associated with the captured image 206.

For example, the user may select an option to submit a picture for a product search into an application operating on the computing device. As shown in FIG. 2, in response to the user selecting an option to submit an image search query, an image capture device built into computing device 202 can be activated and a live view of the image capture device can be shown at 204. In some embodiments, computing device 202 can automatically identify objects 206 in the field of view of the image capture device. Once the intended object is shown at 204, the user can select a capture icon 208 to capture an image of the object. In some embodiments, a hardware button (not shown) may be used to initiate capture of the image of the objects.

Once the image of the object has been captured, features of the objects can be extracted. For example, an image matching service may include an object recognition component that is configured to determine an outline of each object shown in the image and match that outline to one or more models that correspond to known objects. Similarly, logos, text, or other identifiers on the object can be detected using a natural language processing component that may identify entities associated with the object or objects. Additionally, or alternatively, image processing techniques may be used to identify color(s), pattern(s), texture(s), etc. associated with the objects. Each of these features may be used to identify matching images with one or more content data stores.

Figure 3:
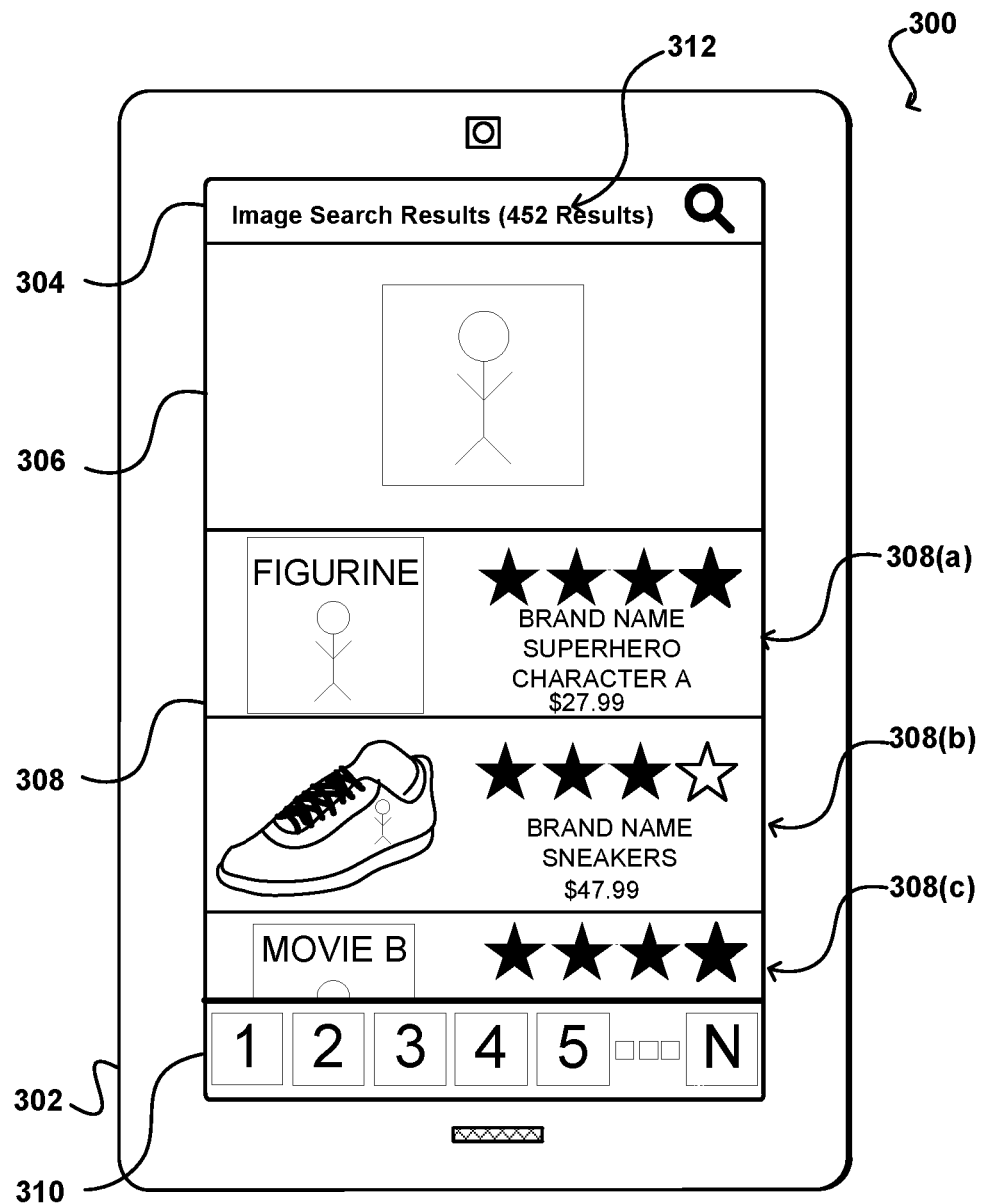

FIG. 3 illustrates an example search result interface display 300 that can be presented in accordance with various embodiments. As shown in FIG. 3, the captured image can be shown at 306, and the results of the image search (as identified at 304), can be shown at 308. For example, a results list 308 has been refined to include a variety of products 308(a)-308(c) that include the same image or a portion of the same image as the captured image 306. In some embodiments, results list 308 can be sorted based on how many features are in common with the object in the captured image 306. However, as shown by the objects 308(a)-308(c) shown in result list 308, the result list may include a variety of products that all share a portion of the image 306 or features associated with the image 306. Accordingly, a wide variety of products may be identified as matching at least a portion of the captured image 306. For instance, as shown by the search results identifier 312, the image query may match or be associated with a large number of products that may cover a large number of different types of products, brands, sub-brands, cross-brands, etc. Browsing through the large number of results may be burdensome and confusing to a user since the search results cover so many different products, brands, etc. For instance, in the search shown in FIG. 3, 452 search results are included in the results list 308 across multiple different pages 310 of search results. While the variety of products may include a portion of the captured image or may be associated with the captured image, the user may not be interested in each of the products. Thus, the user may have to select multiple different pages 310 of products in order to browse through the large number of products to find the appropriate product in which they are searching. This can be time-consuming, annoying, and burden-some on the user.

Accordingly, the user may be provided search results relating to many different types of products related to a particular subject, shape, item, and/or other features of an image query that are not similar to the item and/or image the user was looking for. As such, the user is not being provided relevant items to their image query. Various other approaches may obtain a similar set of results, or similar display of items, such as when the user navigates to a page corresponding to that type of content through a variety of keyword searches and/or navigation interfaces related to the object. However, while such approaches can be very useful and beneficial for users in many instances, there are ways in which the exposure of the user to items of interest can be improved. For example, in a search context, users might want to be able to view content (e.g., images, items, products, etc.) that is responsive to their image search query. Accordingly, systems and methods in accordance with various embodiments can address these and other concerns by providing a data-driven image search approach that provides a user items, products, and images that are likely to be responsive to a particular image query. Such an approach can improve the effectiveness of the search service, can lead to more efficient use of system resources, and can improve the user experience and ability to find relevant items which can increase the likelihood of clicks, purchases, and revenue to the provider of those items.

Figure 4:
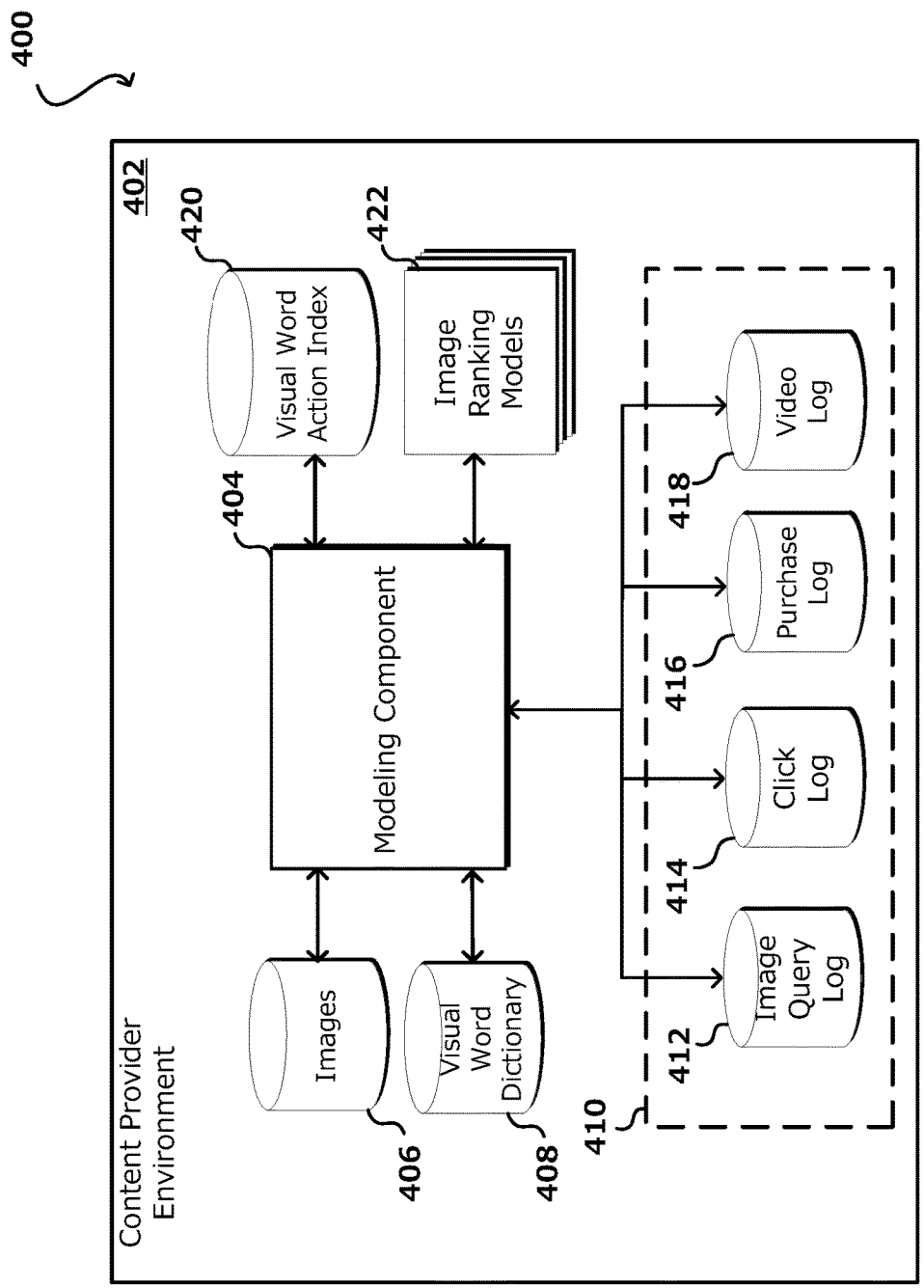
FIG. 4 illustrates an example system that can train an image ranking model and generate a visual word action index that can be used to match and rank images that can be provided to a user in accordance with various embodiments.

FIG. 4 illustrates a block diagram of an exemplary system 400 that can be utilized to train image ranking models and/or a visual word action index that can be used to identify images responsive to a user's image search query. The system 400 may include a content provider environment 402 that is configured to process historical action data tracked by the content provider environment or by a third party provider. The content provider environment 402 may include a modeling component 402 that is configured to obtain information from an images datastore 406, a visual word dictionary datastore 408, and/or historical action data 410 to generate a visual word action index 420 and/or image ranking models 422. The images datastore 406 may include stored images associated with content provided through the content provider environment 402. The images datastore 406 may include information for the corresponding products, items, videos, and/or any other content that is provided by the content provider environment 402.

The visual word dictionary 408 may include visual words that are extracted and/or identified by processing the plurality of images present in the images datastore 406. The modeling component may generate the visual word dictionary and/or the visual word dictionary may be generated by another service, module, and/or entity. The visual word dictionary 408 may include mappings or relationships between the images that contain and/or were the source of the visual words stored in the visual word dictionary 408. For example, the visual word dictionary may store a record associated with a visual word and the images that the visual word belongs to or originated from. The visual words may be extracted using the same visual word identification algorithms/techniques on the images and/or by using a variety of visual word identification algorithms and stored in separate datastores. Thus, the visual word dictionary may map each of the visual words to a set of images that contain the visual word. The visual word dictionary can also store the position the word occurred in the image, for example, the position related to other words in the image and/or predetermined regions within each image that correlate to importance of the information in that area for most images (e.g., center, etc.). Moreover, only a closest visual word and/or a subset of the most representative visual words may be stored for each image.

Any suitable processes and/or algorithms may be used to extract and/or identify visual words associated with a particular image. For example, k-means, hierarchical k-means, deep learning, or any other clustering mechanisms may be used in identifying and extracting the visual words. Additionally, in some embodiments, feature descriptors for each image may be extracted and any visual words corresponding to the image can be determined by clustering the extracted feature descriptors. In various embodiments, each feature descriptor that was identified in the image corresponds to a visual word. Thus, a visual word can be seen as a cluster of image features having the same or similar visual characteristics. Such matching or similar visual characteristics may correspond to, for example, any particular logos, textures, patterns, colors, features, trade dress, etc. Approaches for determining visual words are discussed in U.S. Pat. No. 8,756,216, issued Jun. 17, 2014, entitled "Scalable Tree Builds for Content Descriptor Search," and in U.S. Pat. No. 8,352,483, issued Jan. 8, 2013, entitled "Scalable Tree-based Search of Content Descriptors," both of which are incorporated by reference herein for all purposes.

In this example, a modeling component 404 or other such component, service, etc. can be used to train one or more image ranking models 422 and/or generate a visual word action index 420. To generate the visual word action index 4206 or other such index, the modeling component 404 analyzes historical action data 410 to determine a record of a number of occurrences one or more images were selected in response to a particular image query, purchased in response to the particular image query, placed in an electronic shopping chart in response to the image query, a video associated with the image was selected or played, and/or other action showing some level of interest in an image and/or associated item in response to the image query. Using the historical action data, at least one image is identified that is responsive to a particular query based on the logged actions, and the closest visual word and/or visual words that are associated with the image query that caused the action (e.g., selected, purchased, etc.) are mapped to the appropriate image. This relationship is stored in the visual word action index 420.

In accordance with various embodiments, historical action data 410 can log all image query and log information of all the images from the search results that were clicked, purchased, and/or had any other relevant actions for an input image query. For example, the historical action data 410 may include the data in an image query log 412 stored in one or more image query log datastores, data in a click log 414 stored in one or more click log datastores, data in a purchase log 416 stored in one or more purchase log datastores, and data in a video log 418 stored in one or more video log datastores. Although these databases are shown as separate databases, it should be noted that the data in each of these databases can be part of a single database or spread across a plurality of databases.

The image query log 412 may include a log of a plurality of image queries for items. For example, the image queries can include images that were submitted during searches for items provided through the electronic marketplace and may include a copy of an image that was submitted for the search query. Additionally and/or alternatively, in some embodiments, the query image may not be stored and instead, the closest visual words that were identified and used in the image query may be stored. Further, in some embodiments, the image query log 412 may include other features extracted and/or identified from the image query. In some embodiments, the image query may include words and/or numbers used to search for a particular item along with the image query. An example query can be a picture of a book cover, where the query is intended to retrieve other books associated with the book (e.g., other books by the author, other titles in the series of books, etc.). Accordingly, the image query log 412 may store a query identifier that allows the particular query to be identified, copy of the image, a closest visual word or a set of closest visual words extracted and/or identified as being associated with the image, a user identifier associated with the query, a time, date, IP address, device identifier, and/or any other relevant information to the image query.

The click log 414 includes a log of images selected in response to a particular image query. For example, in the situation where the image query is a book cover and an image of another book is selected (or "clicked on") in response to the image query, a record of the selected image is entered in the click log. Additionally and/or alternatively, in some embodiments, the item selected may be associated with one or more images and each of the images may be logged as being "clicked on" or selected.

The purchase log 416 includes a log of images associated with items purchased in response to a particular image query. For example, in the situation where the image query is a picture of a book cover and another book is purchased in response to that image query, a record of the purchased book and/or a record of the one or more images associated with the purchased book may in response to that image query is entered in the click log. For either the record for the click log or the record for the purchase log, the record can include the image query identifier, a copy of the image from the image query, and/or any other information associated with the image query and the corresponding action (e.g., click or purchase) resulting from the image query. Similarly, the video log 418 includes a log of images associated with videos (or other media) played or selected in response to a particular image query. For example, in the book cover image query situation if a user decided to watch a trailer associated with a movie that is being released associated with the book, a record of an image from the video or associated with the video in response to that image query is entered in the video log 418. Note that other information can be used as historical action data as one skilled in the art would identify.

The visual word action index 420 maps each visual word stored by the system that has an action associated with it to at least one image (in the product database) that had an action associated with it due to some past query image. Accordingly, the visual word action index 420 may have a mapping for each image having an action logged in response to the particular image query of the plurality of queries to at least one visual word associated with each image query that resulted in the image having the action logged. Additionally, in some embodiments, multiple images of the same object may be identified as a single set of visual words. As such, in some embodiments, the visual words may be identified as being stored with a specific item and the visual words may map to the item and the set of images associated with the item.

The visual word action index 420 may also store an image action probability and a visual word probability for each visual word that is associated with the image. An image action probability can include one of, or a combination of, a click probability, a purchase probability, an action probability (e.g., a probability of an action showing some level of interest in an item associated with the image in response to an image query). In the situation where just a click probability is determined (or used), the image action probability is based on the click probability. Similarly, in the situation where just a purchase probability is determined (or used), the image action probability is based on the purchase probability. In the situation where both the selection and purchase probabilities are determined and used, the image action probability can be a combination of the two probabilities where value of the click probability can be combined with the value of purchase probability. For example, the different types of actions may be weighted such that purchases are worth more than clicks and vice versa. Additionally and/or alternatively, each of the different types of actions may be weighted the same. The image action probability may be stored in a data structure such that for every image in the visual word action index 420, there will be a number that is the image action probability of that image that is previously calculated and based on the most recently updated historical action data.

In some embodiments, the visual word action index 420 may generate the image action probability that indicates the probability that an image is selected by a user based on the previously received image queries. Calculating the image action probability may include computing the total actions for all images over a period of time and the actions for the particular image over the same period of time. Accordingly, the modeling component 404 may identify, for example, all of the clicks on all images for a day. The modeling component 404 may also identify all the clicks on the target image for the day. The modeling component 404 may also add the decayed clicks of all images from the history for both the image and all the images. Accordingly, the image action probability p(d) may be shown as:

$$p(d = d_j) = \left( \frac{ct[d_j] + K * ch[d_j]}{\sum_i ct[d_i] + K * ch[d_i]} \right) \quad \text{(Equation 1)}$$

where d is the image or document (item identifier) associated with multiple images, where K is the decay factor constant, ct[d] is total clicks today for the image (d) for all images ($d_i$), ch[d] is historical clicks for image d. Clicks ct[d] aggregates all the clicks over all queries seen today. The equation can be adapted to use a combination of actions including clicks, cart-adds, purchases and video consumption actions, as well as any other actions.

Thus, determining an image action probability can include determining a ratio of a number of instances of a particular image selected, purchased, and/or a video associated with the image being played to a total number of instances of images being selected, purchased, and/or videos associated with the images being played. For example, assume an image associated with a book is selected 1000 times and purchased 500 times over a period. Further, assume that during the same period all the other images tracked by the system were selected 1,000,000 times and purchased 500,000 times. In such a case, the image action probability for the book image (or a set of images associated with the book) is the ratio of the number of times the book had an action associated with it (e.g., 1500 times) over the total number of instances of all the images having an action associated with them (e.g., 1,500,000 times) (assuming we have a decay factor constant of K=0 such that we are not factoring in historical clicks outside of the current time period). In this example, the image action probability for the image associated with the book is 1/1000 which is 0.001 or 0.1 percent. This example assumes both selection and purchase history information is available and is equally weighted such that the image action probability includes a combination of the probabilities for the particular user or a general user, as may be based upon historical click data and historical purchase data for the particular user and/or other users. For example, if the data is specific to the user, the action instances may be much lower and the image action probability would be increased for the image. In the situation where only the click probability is used, the image action probability is that of the click probability.

In some embodiments, the visual word action index 420 may generate a visual word probability P(w|d) that indicates the probability of the visual word (w) given the document image (d). Calculating the visual word probability may include identifying all the query image visual words (w) that resulted in an action for the image (d). Decayed actions can be added as described above. Accordingly, for click actions, the image action probability P(w|d) may be shown as:

$$p(w = w_i \mid d = d_j) = \left( \frac{ctw[w_i, d_j] + K * chw[w_i, d_j]}{\sum_m ctw[w_m, d_j] + K * chw[w_m, d_j]} \right) \quad \text{(Equation 2)}$$

where ctw[w, d] is total clicks today and chw[w, d] is historical clicks for image d for visual word w in the image query. The clicks for each visual word (w) and document (d) pair, ctw[w,d], aggregates the clicks over all queries seen today. The equation can be adapted to use a combination of clicks, cart-adds, purchases and video consumption actions as well as other actions as described above.

For example, using K=0 to assume that decaying historical clicks are not included, assume 3 queries are received for an image (d) today which have the closest visual words of $q_1=[w_1\ w_2]$, $q_2=[w_1]$, and $q_3=[w_3\ w_4]$. Each of these queries led to image (d) being clicked. The click table for image d can be summarized as: $(w_1:1), (w_2:1), (w_1:1), (w_3:1), (w_4:1)$.

Thus, for each of the mappings between image (d) and the set of visual words (w1-w4) that resulted in a click for image (d), the corresponding visual word probabilities for each visual word would be: $p(w_1|d)=(2/5)$, $p(w_2|d)=(1/5)$, $p(w_3|d)=(1/5)$, and $p(w_4|d)=(1/5)$.

In some embodiments, the visual word probability may also include whether the visual word exists in the image. Accordingly, a larger probability value may be provided if the visual word is present in the image. As such, both historical action data (e.g., click behavior) as well as the existence of the same visual word being present in the image may be used to increase the probability for the visual word given the image. For example, visual words may lead to a selection of an image while also being found in that image. Thus, by incorporating additional value for the existence of the visual word in the image, the probability that the visual word is relevant to the image is increased and that increased likelihood may be incorporated into the valuation of the image as a potential match for an image query.

In some embodiments, the visual word action index 420 may also include position information associated with each of the visual words to identify the importance of each visual word to an image based on where the visual word is located within the image. For example, visual words closer to the center of the image may be more important than visual words near the boundaries of the image. Accordingly, the position where the visual word was located in the image may be used to provide further granular mapping capabilities in the visual word action index 420. For instance, mappings may include a position dimension for each visual word mapping to an image to identify where the visual word was located that resulted in the action associated with the image. This information may be used when matching images in response to an image query to obtain matching images having visual words that originated from similar areas of the images.

In some embodiments, the visual words included in the visual word action index 420 may be limited in order to reduce the size of the index. For example, the visual words that are used to populate the visual word action index 420 may be from salient regions (e.g., center) and/or have salient features (e.g., bright colors) of the originating images to reduce the size of the visual word dictionary and/or the corresponding index size and to ensure the applicability and quality of the visual words included in the visual word action index 420. Moreover, visual words that are present in too many images may be removed as well as these visual words correspond to features within the images that are not distinguishing between different images (e.g., a background area of an image present in many query images but have low value for classification).

In accordance with various embodiments, the modeling component 404 can be used to train a plurality of image ranking models based at least in part on the historical action data (e.g., the data included in the image query log 412, the click log 414, and the purchase log 416). Image ranking models can be associated with a weighting factor. The weighting factors associated with the image ranking models can be different, the same, or a combination thereof. For example, the weighting factor associated with a click action can be associated with a first weighting factor, probabilities associated with a purchase action can be associated with a second weighting factor, and probabilities associated with a video action can be associated with a third weighting factor. Training the image ranking models can include determining a weighting factor for a respective image ranking model. For example, the historical data can be analyzed using, for example, a neural network to determine an appropriate weighting factor for each of the image ranking models. As will be apparent to persons of reasonable skill in the art, training an image matching model is well known and such approaches will not described further herein.

Figure 5:
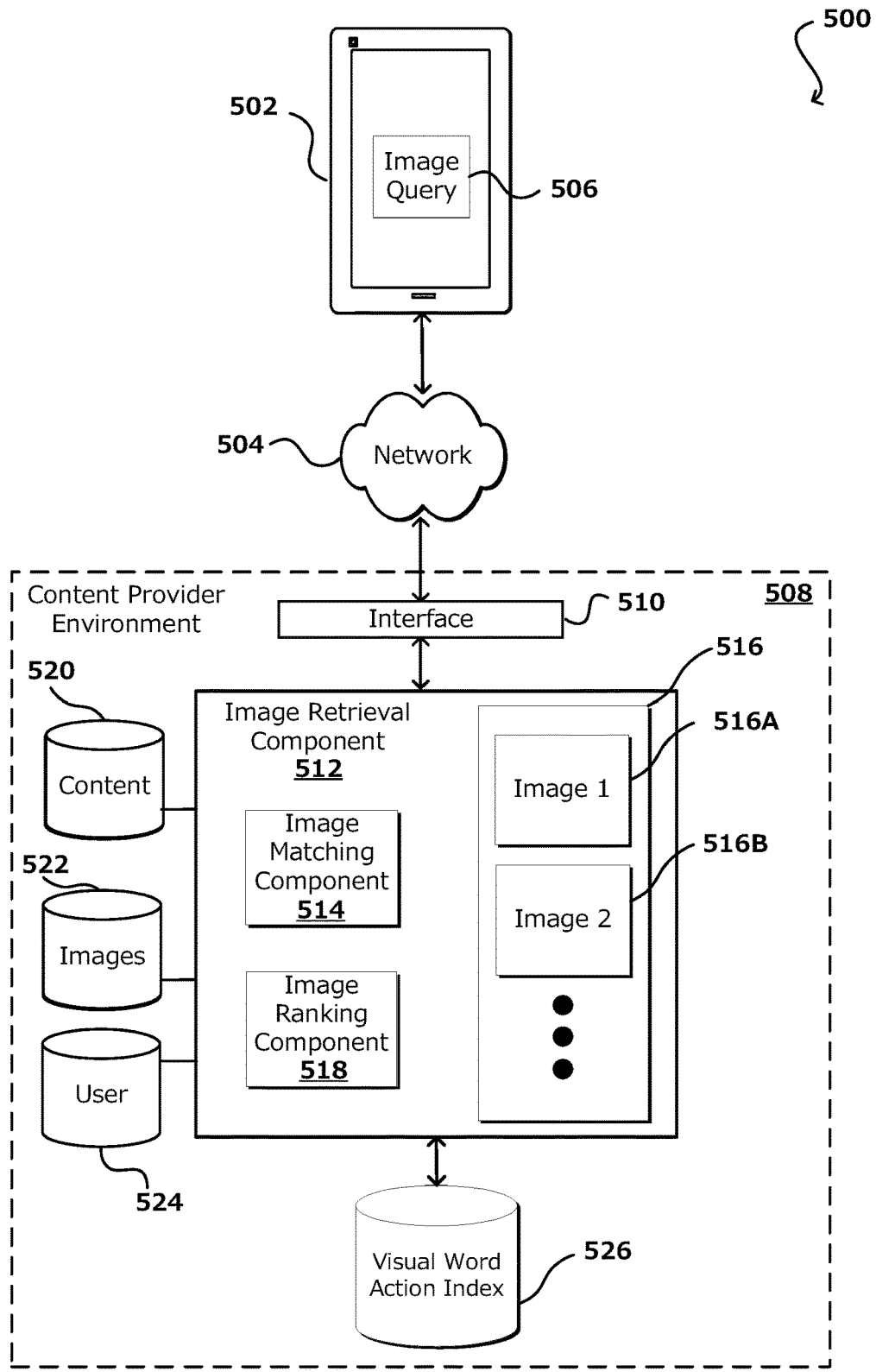
FIG. 5 illustrates an example system that can be used to determine items that can be provided to a user in accordance with various embodiments.

FIG. 5 illustrates an example environment 500 that can be used to implement aspects in accordance with various embodiments. In FIG. 5, a client computing device 502 can submit an image query 506 for content across at least one network 504 to be received by a content provider environment 508, such as an electronic marketplace. The content can include items that can be consumed through the content provider environment. In this example, an image query received to the content provider environment 508 can be received by an interface layer 510 of the environment. As known for network environments, the interface layer can include components such as interfaces (e.g., APIs), load balancers, request and/or data routers, and the like. If the image query is a request for relevant items and/or images related to the image query, information for the image query can be directed to one or more image retrieval components 512, which can obtain the content from a content data store 520 or other such repository to be sent back across the network(s) to the computing device. In some embodiments, information for the image query might also be compared against user data in a user data store 524 or other such location to determine, for example, whether the user has access rights to those images and/or items. In one example, images stored in a images data store 522 can be associated with items of interest to consume, a plurality of images to be displayed as part of a set of search results or set of potential items of interest, although various other types of content and uses for images can be utilized as well within the scope of the various embodiments.

The example content provider environment 508 of FIG. 5 uses a visual word action index 526 of an image retrieval component 512 (e.g., a search engine, etc.) to determine relevant images to provide to a user in response to the image query in accordance with various embodiments. The query is directed to an image retrieval component 512 configured to retrieve images responsive to the image query. The image retrieval component 512 includes one or more image matching components 514 and image ranking components 518 which are configured to communicate with a visual word action index 526. Note that the query may also be a video where each of the subsequent image queries in the video are similar. In such instances, the visual words and/or corresponding matching images may be approximated as the same as the previous image query. As such, in some embodiments, the image matching component 514 may identify the differences between subsequent image queries and/or identify a video query and use the previously identified matching images and/or visual words associated with the previous query as a response to the video query and/or similar image queries.

The image matching component 514 is configured to process the received image query to identify one or more visual words associated with the image query 506. The visual words may include a subset of the identified visual words associated with the image query. For example, the visual words may include the closest visual words, a visual word associated with a clustering of visual words, and/or through any other suitable method of identifying the closest visual words associated with an image. The image matching component 514 may search a visual word action index 526 using the identified visual words from the query image 506 to identify images that have previously had an action associated with them in response to image queries having at least one of the same visual words. As described above, the visual word action index 526 may include a mapping of visual words to images having an action associated with the visual words. Accordingly, the image matching component 514 may search the visual word action index 526 and obtain a set of matching images 516 including at least a first matching image 516A and a second matching image 516B that correspond to the visual words in the received image query 506.

The image matching component 514 may obtain the set of matching images 516 through any suitable analysis and/or comparison process. For example, in some embodiments, the image matching component 514 may obtain any images that match at least one of the visual words from the received image query 506. Thus, the image matching component 514 may compare the visual words from the image query to the visual word action index 526 and identify any associated images associated with at least one of the visual words from the image query 506.

In another embodiment, the image matching component 514 may use a matching score (e.g., a term frequency inverse document frequency score) returned from the searching and/or matching functionality to identify a set of matching images and may optimize the set of results to limit the number of resulting matching images. For instance, the image matching component 514 may only include a predetermined number of the highest scoring image matches in the set of matching images. The image processing involved in identifying and comparing visual images between images can be computationally intensive and limiting the result set of matching images can provide system resource and time efficiencies for the image matching component. For example, in some image matching processes, geometric verification processes may be applied to all of the matching images before providing the set of matching images to an image ranking function to ensure the images are good matches. However, the geometric verification process is resource intensive and if the system can remove low probability image matches before performing the geometric verification, processing efficiencies can be obtained leading to faster and more efficient image matching processing. For instance, under term frequency inverse document frequency techniques, retrieval from the visual word action index may provide a term frequency inverse document frequency (TF IDF) score for each returned image match result. The TF IDF score may be used to pre-rank the image matches, remove image matches below a matching score threshold and/or only select a predetermined number of matching images based on the TF IDF score, and provide a smaller set of matching images for the computationally intensive image processing techniques.

In another embodiment, the image matching component 514 may use the historical action data to optimize the matching images using the matching score (e.g. TF IDF score) as well as the historical action data. For example, a modified historical TF IDF score may be used to further differentiate, pre-rank, and remove low probability matches in light of the historical action data before further image processing occurs. Accordingly, in some embodiments, the probabilities associated with the historical action data that were previously calculated can be used by the image matching component to pre-rank the image matches, remove image matches below a matching score threshold and/or only select a predetermined number of matching images based on, for example, the modified TF IDF score, and provide a smaller set of matching images. Accordingly, the historical action data may be used in image retrieval during matching of an image to the visual word index as well when ranking the various images as will be described in further detail below.

The set of matching images 516 may include image information for each of the matching images 516, an identifier for each of the matching images 516, probability information associated with each of the set of matching images 516, and/or any other suitable information to allow the image ranking component 518 to identify a ranking for each of the set of matching images 516. Image action probabilities and visual word probabilities associated with each mapping within the visual word action index may be obtained and provided for each of the images with the set of matching images 516 and used to calculate a relevance score based on the tracked behavioral action information in the visual word action index 526.

In accordance with an embodiment, when content is to be provided to a user in response to the image query, the image retrieval component 512 in this example can contact an image ranking component 518, or other such system or service, in order to determine which items are to be provided, and in what order. The image ranking component 518 is configured to receive the set of matching images and apply one or more image matching models to rank each of the matching images. For example, in one embodiment, the image ranking component 518 may use the previously calculated image action probability and visual word probabilities for each of the matching images to calculate a ranking score. For instance, the image ranking component may compute an image selection probability p(d|q) of an image (d), given an image query (q). The image ranking component may use Bayes rule calculations to determine the image selection probability as being equal to the probability of the image p(d) given the likelihood of each visual word (w) for the image (d). These probability values may have previously been calculated when analyzing the historical action data. The image ranking component may obtain all the previously calculated probability information stored in the visual word action index and/or stored in other tables associated with the visual word action index. Accordingly, an equation to calculate the image selection probability is as follows:

$$p(d|q) \propto p(d)\Pi_t p(w_t|d) \quad \text{(Equation 3)}$$

The image ranking component may generate the image selection probability and rank the set of matching images by the scores of the image selection probability. However, other ranking methods can also be implemented. For example, P(d|q) can be used as a feature along with other term frequency inverse document feature processing of the images to generate image ranking models using machine learning techniques to weight the importance of different features and relevance scores. The machine learned image ranking model can then be used for query-time ranking by the image ranking component 518. Additionally, in some embodiments, the image ranking component 518 may be configured to apply the results of other matching processes and apply different image matching models to obtain the best matching images for each image query. Image ranking models can be associated with a weighting factor and the weighting factors associated with the image ranking models can be different, the same, or a combination thereof.

In some embodiments, the image ranking component may use image ranking models that incorporate the location of visual words extracted from the image query and weight the probability of visual words for the image based on the location of the visual word within the image query. For example, additional value may be provided to visual words in the matching images that are that are in more important positions within the matching images. For instance, an equation showing the relationship is below:

$$p(w_t, I_t = \text{center} | d) \geq p(w_t, I_t = \text{border} | d) \quad \text{(Equation 4)}$$

where $I_t$ stands for a location of the visual word in the image query. When applied to the image selection probability, the image selection probability equation for those embodiments incorporating the position of the visual word may be:

$$p(d|q) \propto p(d) \Pi_t p(w_t, I_t | d) \quad \text{(Equation 5)}$$

where the query $q = \{w_t, I_t\}$ and the visual word probability based on the position of the visual word is:

$$p(w_t, I_t | d) = p(I_t | w_t) p(w_t | d) \quad \text{(Equation 6)}$$

The probability of the location of the visual word in the image query can be modeled using Gaussian or another box distribution with a mean as (1) a center of an image or (2) the position in the image d where the same visual word $w_t$ occurs.

Additionally, other information may be used to assist in ranking the matching images. For instance, using the example provided above regarding the book cover query image, a page of content might display images for other books associated with the book captured in the image query that the user can purchase. In order to determine which of the books the user is most likely to view or purchase, the image ranking component 518 can look at the image selection probabilities associated with each matching image. Along with the image selection probabilities, the image ranking component 518 can obtain revenue, profit, and/or other financial data for the items to potentially be displayed to the user. This can include financial data from another data store of the provider. The image ranking component 518 can consider information such as the amount of profit that would be generated through the sale of each item, the amount of ad revenue for a click or selection by the user, a cost to store the item, and/or other such data. The image ranking component 518 can also look at the probabilities and the financial data for the various items to determine which items to display to the user, and the order in which to display those items, based thereon. This can include, in some embodiments, the items most likely to be viewed and/or purchased by the user, while in other embodiments can include the items most likely to generate profit for the provider, supplier, or other such party based at least in part upon the items most likely to be viewed or purchased along with the relevant profit for each.

Once a ranking and/or selection of the set of matching images is determined, the data (e.g., an identifier associated with each selected image from the subset of selected matching images) can be passed to the image retrieval component 516 which, in this example, can generate the appropriate code or otherwise cause the corresponding images to be provided in content for the user. This can include, for example, generating HTML to be rendered in a browser application on the client device to enable images to be displayed in an arrangement based at least in part upon the determined ranking. Additionally, the image retrieval component may obtain item information, product details, pricing, etc. from the content data store 520 to provide with each of the images.

In accordance with an embodiment, when information for a new image is received, information in regard to the visual words and probability can be determined once sufficient historical action data is obtained. It should be understood that not every item will have sufficient historical action data to be actionable as an entry in the visual word action index or with one or more image ranking models, but the probabilities can be based at least in part upon the information available. An appropriate probability model, such as a beta-Bernoulli or Bayesian regression model, can be used to gather the values for the various historical data actions and generate the probabilities for both clicks and conversion for various items and/or content with respect to a user (or group of users, etc.). Such a model can also provide an uncertainty, or variance, which can be used to assist in the rankings of the various items.

Figure 6:
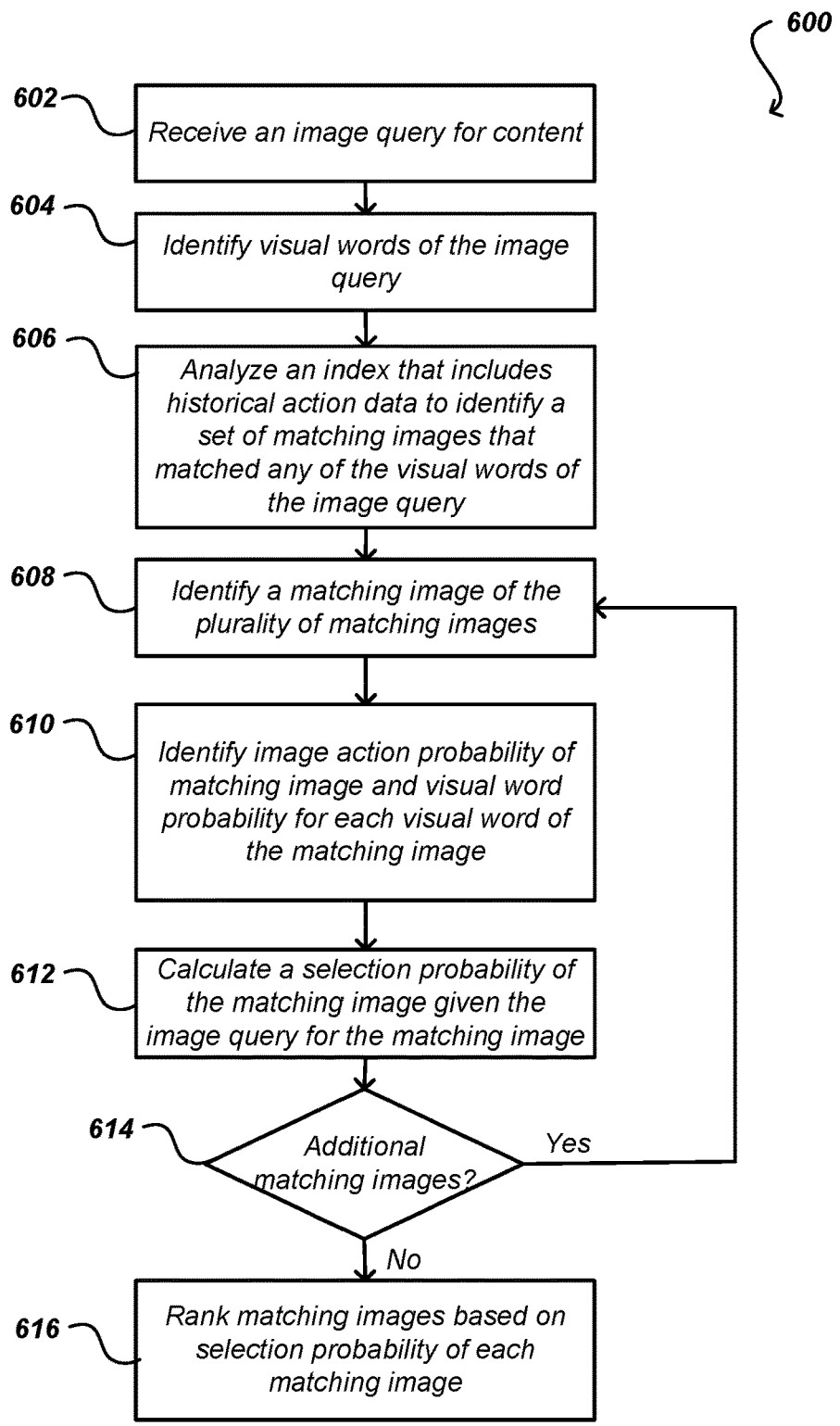
FIG. 6 illustrates an example process for determining items that can be provided to a user in accordance with various embodiments.

FIG. 6 illustrates an example process 600 for determining content to be provided for a user that can be utilized in accordance with various embodiments. It should be understood that, for this and other processes discussed herein, there can be additional, fewer, or alternative steps, performed in similar or alternative steps, or in parallel, within the scope of the various embodiments unless otherwise stated. In this example, an image query 602 is received for content (e.g., images and/or items for consumption) to be displayed on (or otherwise presented via) a computing device, in this case for a particular user of the computing device. In response to the image query, a set of relevant images associated with content items can be determined, where that set can, in different embodiments, include some or all of the content that could be provided in response to the image query. This can include, for example, a set of images and related information for items associated with the images. In order to determine which of the items to display, and/or the order or arrangement in which to display those items, a ranking score is calculated for each of the set of images. In this example, the image query is received by an appropriate component, such as an image retrieval component 512. The image retrieval component 512 includes an image matching component 514 and an image ranking component 518 that are configured to use one or more image ranking models and a visual word action index 526 to identify and provide relevant images based on behavioral user information to a user.

The image of the image query may be processed in order to identify 604 a set of visual words associated with the image query. As discussed above, any suitable visual word extraction and/or identification algorithms and processing steps may be performed to identify the set of visual words associated with the image query. The visual word action index can be analyzed 606, based at least in part on the set of visual words associated with the image query, to identify a set of image matches based at least in part on the set of visual words. As described above, the visual word action index analysis may include any one of (1) a comparison of whether an image was selected in response to a historical image query matching at least one of the visual words in the present image query is present in the index, (2) using a matching score to pre-rank and/or remove potential matches that have a low probability of being a selected image based on the matching score or (3) using a modified matching score incorporating historical action data to pre-rank and/or remove potential matches with low probabilities based on the historical action data in order to obtain the set of image matches. For example, for process (1), the image matching component may search the visual word action index for images of the plurality of images stored within the visual word action index that matched at least one of the set of visual words associated with the image query. As such, the image matching component may identify any selected images that share at least one visual word with the image query. Once the set of matching images is determined, the image matching component may identify 610 a corresponding image action probability for each matching image and a visual word probability for each visual word of the matching image.

Using the image action probability for each matching image and a visual word probability for each visual word of the matching image, a selection probability of the matching image given the image query may be calculated 612 for the matching image. The selection probability of each matching image may be determined by multiplying the respective image selection probability of each image of the set of image matches by the product of each of the visual word probability for each visual word within the set of visual words for each matching image. The image matching component may determine 614 if there are additional matching images in the set of matching images in order to calculate a selection probability of each of the matching images in the set of matching images. If there are additional image matches, the image matching component may repeat steps 608-612 for each matching image until a selection probability of each matching image is calculated for each of the set of matching images.

Once an image selection probability is obtained for all the matching images for the search query, each of the images within the set of matching images may be ranked 616 according to the selection probability for each of the set of matching images. In some embodiments, the image matching component may calculate the selection probability and provide the selection probability for each matching image in the set of matching images to an image ranking component. In some embodiments, the image matching component may provide the set of image matches, an image selection probability for each of the set of image matches, and a visual word probability for each visual word within the set of visual words for each of the set of image matches to an image ranking function which may be used to generate a ranking score for each of the set of image matches. The ranking score may be used in display of a subset of the image matches and the image retrieval component may retrieve the subset of the image matches for display and arrange the subset of the image matches based at least in part on the respective ranking score.

In some embodiments, the image ranking function may be provided the set of matching images or identifiers associated with the matching images, the image action probability associated with each image of the set of matching images, and the visual word probability for each visual word of each image of the set of matching images. The image ranking function may generate a ranking score that is used in display of images associated with the image query. In some embodiments, the image ranking function may implement one or more image matching models that provide various weightings for different visual word probabilities based on the location of the visual word in the corresponding image. Further, the image ranking function may implement various ranking metrics from multiple different ranking processes and weight each of the image matching results based on machine learning processes to identify the best weightings of the various ranking processes. For example, in some embodiments, the image ranking function may implement a ranking process based on both traditional term frequency— inverse document frequency features of the images and the behavioral image selection probabilities for each of the matching images described herein in a machine learning framework to rank images. Accordingly, embodiments may incorporate the historical action data of users interacting with the content provider with more traditional image search methods and weight the impact of the various processes using an image matching model.

Figure 7:
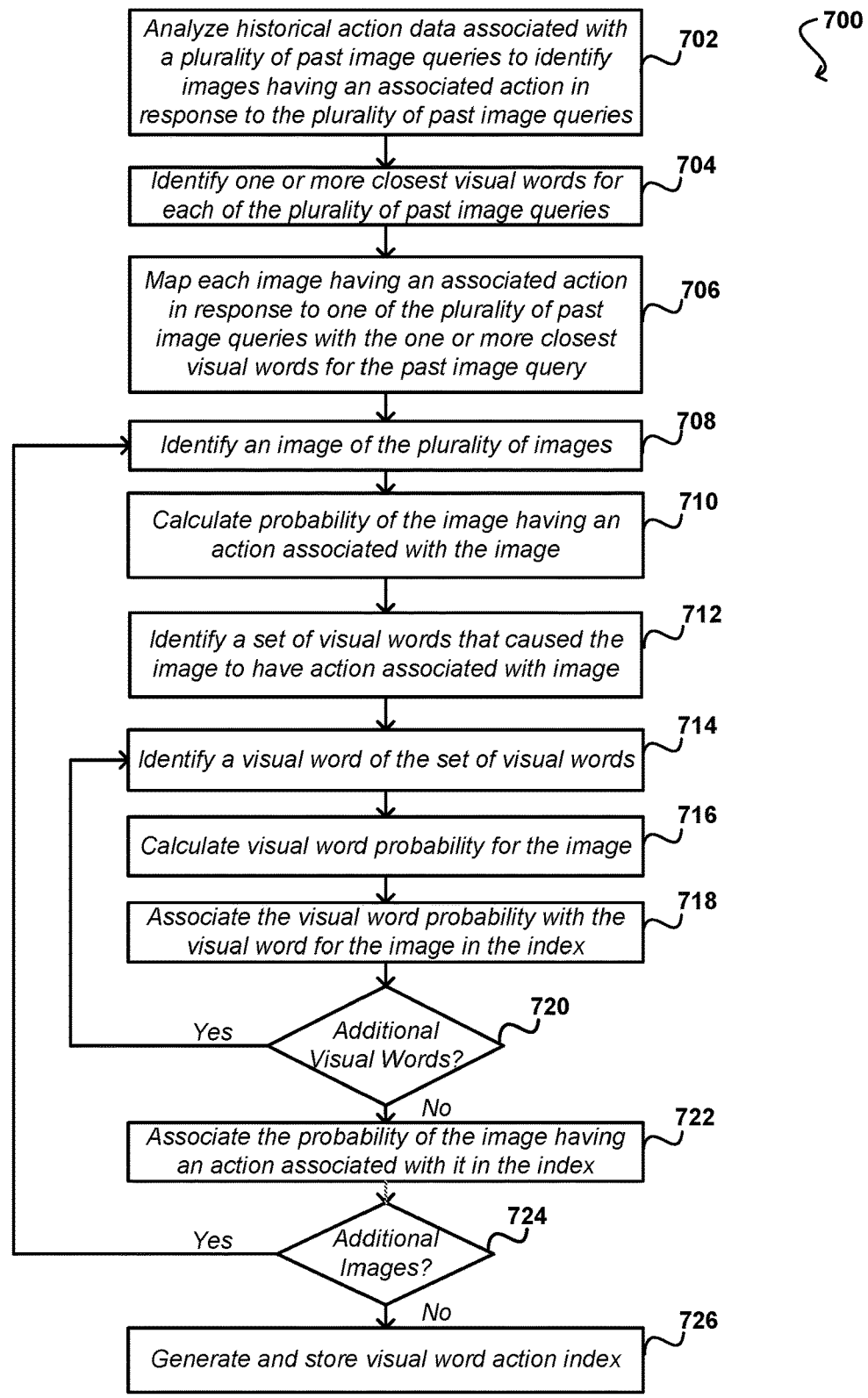
FIG. 7 illustrates an example process for generating a visual word action index in accordance with various embodiments.

FIG. 7 illustrates an example process 700 for generating a visual word action index that can be used to identify relevant images and corresponding content for various items based on a user's image query in accordance with various embodiments. In this example, a modeling component or other such component is used to generate a visual word action index. To generate the visual word action index or other similar index, historical action data associated with a plurality of historical image queries is analyzed 702 to identify a plurality of images having an associated action in response to the plurality of image queries. The historical action data may indicate at least one image of a plurality of images selected in response to a particular past image query for each of the plurality of past image queries. The plurality of image queries may be referred to as image queries, past image queries, or historical image queries and reference the information stored in the query logs, click logs, purchase logs, etc. The logs collected the historical actions of users of the image retrieval system in response to the historical image queries. The modeling component may identify 704 at least one closest visual word for each of the plurality of past image queries in the historical action data. In some embodiments, the one or more closest visual words for each image query may already be stored in an image query log for each of the image queries. In some embodiments, the modeling component may implement a visual word extraction and/or identification process to identify the one or more closest visual words associated with each of the plurality of image queries. The modeling component may map 706 each image having an associated action in response to one or more of the plurality of image queries to the one or more closest visual words for the image query. Accordingly, in some embodiments, analyzing the historical image data may include determining a first image query of the plurality of image queries, determining at least one visual word associated with the first image query, identifying a first image selected in response to the first image query of the plurality of image queries, and mapping the first image to each of the at least one visual word associated with the first image query in an index.

Once the initial mappings have been generated, the modeling component may update each of the mappings to include probability information based on the instances of actions for each image and each visual word of each image. For example, the modeling component may determine a respective image action probability and a respective visual word probability for each of the at least one visual word given the image for each mapping within the visual word action index. The modeling component may identify 708 an image of the plurality of images in the visual word action index. An image action probability that captures the probability of an image having an action associated with the image may be calculated 710. For instance, the image action probability (also referred to as a click probability, purchase probability, etc.) may be generated for each image of the plurality of images within the visual word action index by determining a number of instances where each image was selected, purchased, and/or had an action associated with it in response to the plurality of image queries. The modeling component may determine a number of total instances where any of the plurality of images were selected in response to the plurality of image queries. The image action probability for each image of the plurality of images may be calculated based at least in part on a ratio of the number of instances where each image was clicked and the total number of instances where any image was clicked. The image action probability may be associated with each respective image within the index and/or in another reference table.

The modeling component may also calculate a respective visual word probability for each of the visual words given the image for each mapping within the visual word action index. The modeling component may identify 712 a set of visual words that caused the image to have an action associated with the image from the visual word action index. The modeling component may identify 714 a first visual word of the set of visual words and calculate 716 a visual word probability for the visual word given the image. In some embodiments, the visual word probability may be calculated by determining a number of instances where each image was selected in response to each visual word, determining a number of total instances where each image was selected in response to any of the set of visual words, and determining a visual word probability for each visual word of the set of visual words based at least in part on a ratio of the number of instances and the total number of instances.

Once the visual word probability for the first visual word given the image is calculated based on the historical action data, the modeling component may determine 720 if there are any additional visual words in the set of visual words that caused the image to have an action associated with the image. If there are additional visual words in the set of visual words, the modeling component repeats steps 714-718 for each of the additional visual words in the set of visual words for the image. Thus, a visual word probability for each of the visual words in the set of visual words may be calculated and associated with each visual word mapping for the image in the visual word action index.

Once a visual word probability has been calculated for each of the visual words in the visual word set has been calculated and stored in the visual word action index and/or another datastore associated with the visual word and image identifiers, the modeling component may associate 722 the image action probability with the image in the index. In some embodiments, the image action probability may be associated with each of the visual word mappings to the image within the visual word action index. In other embodiments, a separate index, table, and/or other data structure associated with the visual word action index may store the image action probability for future use. The modeling component may determine 724 if there are any additional images in the plurality of images stored in the visual word action index that have one or more actions associated with them in response to one or more of the search queries. If there are additional images with actions associated with them in the historical action data, the modeling component repeats steps 708-722 for each of the additional images. Thus, the process of generating visual word probabilities for each of the visual words that resulted in each image being selected as the calculation of the image action probability may be repeated for each image stored within the historical action data and/or the visual word index. Thereafter, the visual word action index can be generated 726 and stored for later use. Moreover, where the visual word action index is being updated (not shown) after subsequent image queries are received, only those images that have new historical action data associated with the images may be identified, updated, and have an updated action probability associated with the images. Accordingly, in some embodiments, only those images that have actions associated with them in response to the image queries of the latest historical action data may be updated, have probabilities updated, etc.

Once the visual word action index is generated, a plurality of image ranking models can be trained and weighting factors can be determined based at least in part on the historical action data (e.g., information relating the data in the image query log, the click log, and the purchase log) and stored in at least one data store. An image ranking model can be used to determine a probability of a image match for a given image query. As will be apparent to persons of reasonable skill in the art, training an image ranking model is well known and such approaches will not described further herein. In accordance with various embodiments, although not shown in FIG. 7, as additional image queries and received and tracked by the historical action data, such as actions with items (e.g., selecting and/or purchasing items), the visual word action index and/or image ranking models can be updated. This can include, for example, repeating the steps (or at least some of the steps) in FIG. 7. It should be noted however, that in certain embodiments, the visual word action index and image ranking models are updated after a predetermined number of queries is detected, a predetermined period of time, a combination thereof, or some other event or timing.

Figure 8:
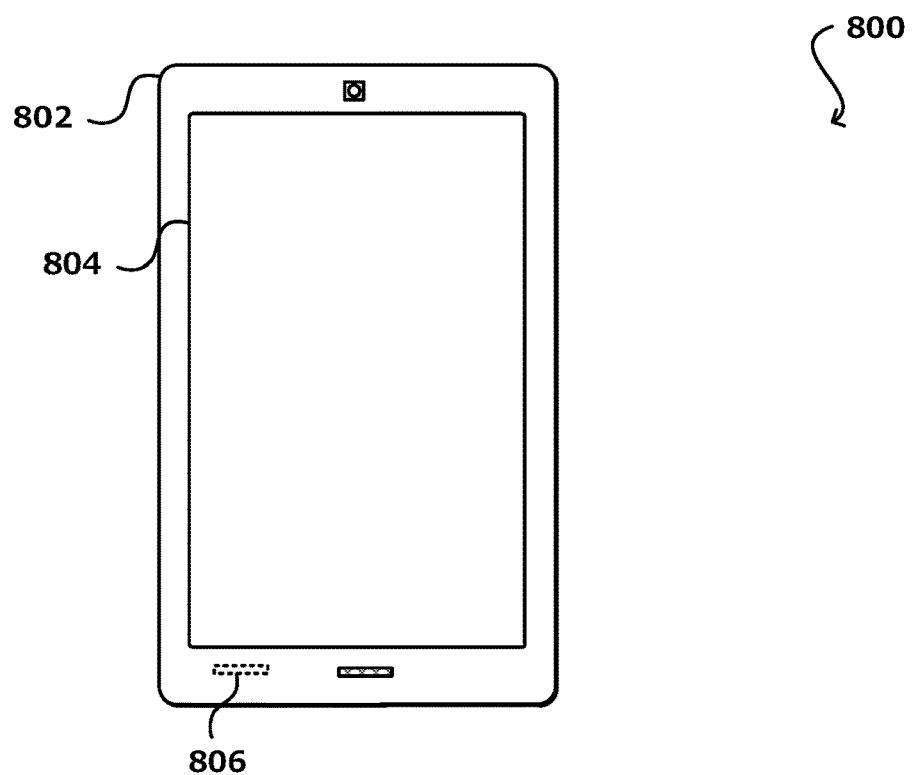
FIG. 8 illustrates an example computing device that can be utilized in accordance with various embodiments.

FIG. 8 illustrates an example computing device 800 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

Figure 9:
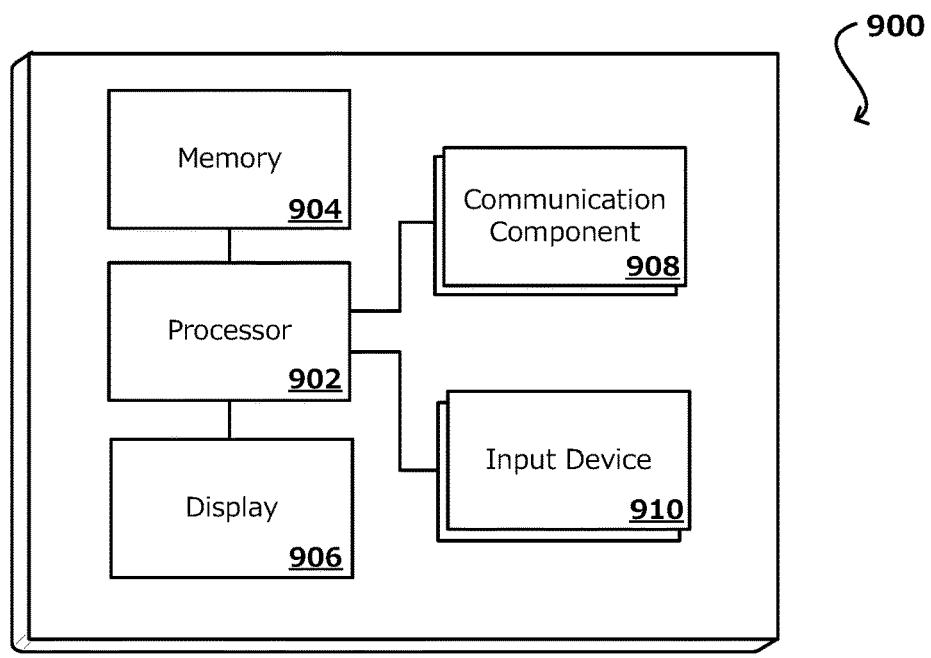
FIG. 9 illustrates an example configuration of components of a computing device, such as the device illustrated in FIG. 8.

In this example, the computing device 800 has a display screen 804 and an outer casing 802. The display screen under normal operation will display information to a user (or viewer) facing the display screen (e.g., on the same side of the computing device as the display screen). As discussed herein, the device can include one or more communication components 806, such as may include a cellular communications subsystem, Wi-Fi communications subsystem, BLUETOOTH® communication subsystem, and the like. FIG. 9 illustrates a set of basic components of a computing device 900 such as the device 800 described with respect to FIG. 8. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device typically will include at least one type of display element 906, such as a touch screen, electronic ink (e-ink), organic light emitting diode (OLED) or liquid crystal display (LCD), although devices such as portable media players might convey information via other means, such as through audio speakers. The device can include at least one communication component 908, as may enabled wired and/or wireless communication of voice and/or data signals, for example, over a network such as the Internet, a cellular network, a Wi-Fi network, BLUETOOTH®, and the like. The device can include at least one additional input device 910 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 10:
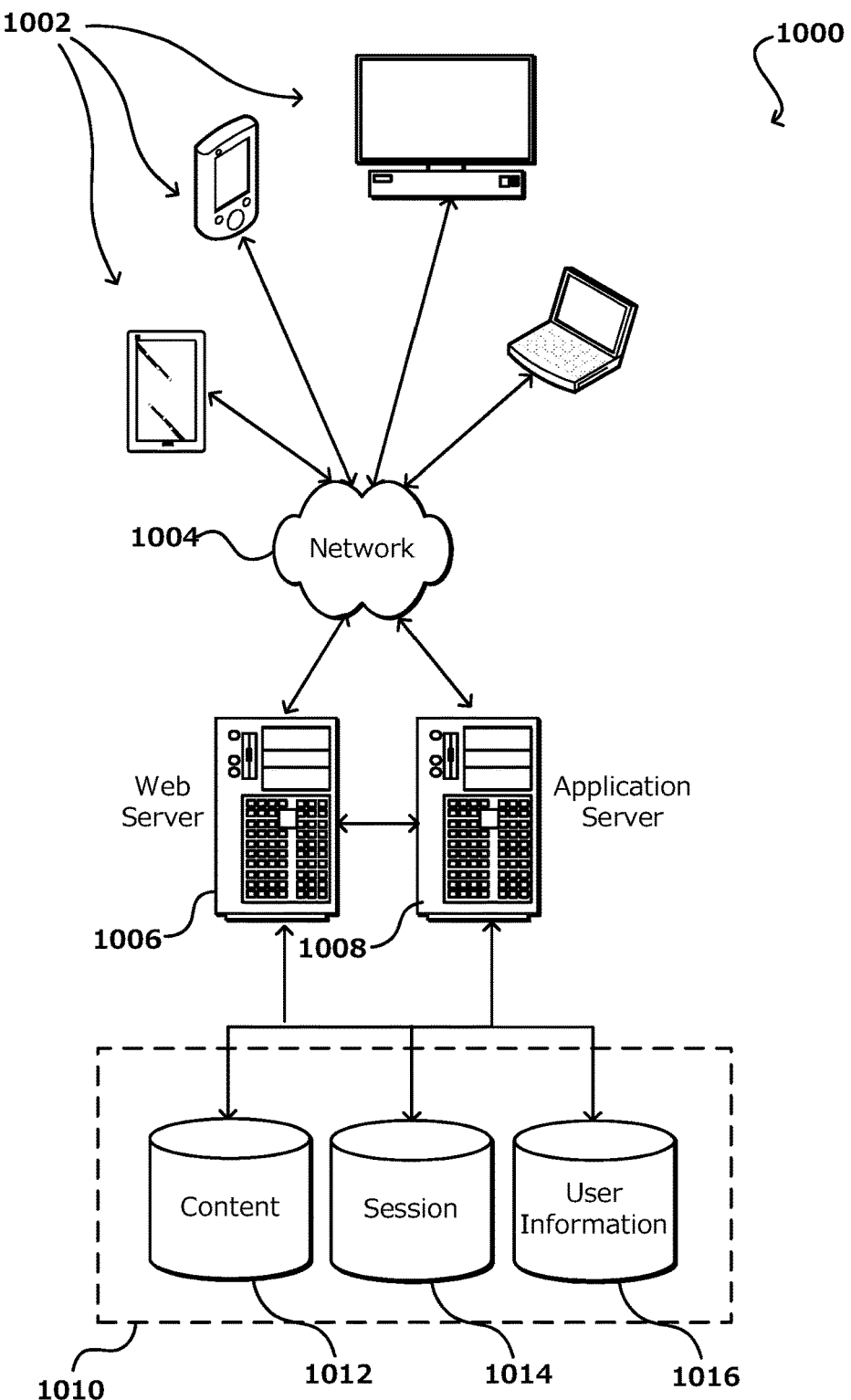
FIG. 10 illustrates an example environment in which aspects of the various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
   identifying a plurality of historical image queries;
   determining historical action data indicating at least one image of a plurality of images selected in response to each of the plurality of historical image queries;
   determining an image action probability for each of the plurality of images, the image action probability determined based at least in part on the historical action data;
   identifying at least one visual word for each of the plurality of historical image queries;
   determining at least one visual word probability for each of the plurality of images based at least in part on the identified visual words and the historical action data, each visual word probability relating an associated visual word with the image;
   generating an index that maps each of the plurality of images to the respective image action probability and the at least one respective visual word probability;
   receiving an image query;
   identifying a set of visual words associated with the image query;
   analyzing the index to determine a set of image matches based at least in part on the set of visual words;
   providing, for each of the set of image matches, the respective image action probability and one or more of the respective at least one visual word probabilities matching a visual word in the set of visual words to an image ranking function, the image ranking function being used to generate a ranking score for each of the set of image matches based at least in part on the respective image action probability and the one or more visual word probabilities; and
   retrieving the subset of the image matches for display, each image match of the subset of the image matches being arranged based at least in part on the respective ranking score.

2. The method of claim 1, wherein determining the image action probability for an image of the plurality of images comprises:

determining a number of instances where the image was selected in response to the plurality of historical image queries; and determining a number of total instances where any of the plurality of images were selected in response to the plurality of historical image queries, wherein the image action probability for the image is based at least in part on a ratio of the number of instances and the number of total instances.

3. The method of claim 1, wherein determining a visual word probability associated with a first image and a first visual word comprises:

determining a number of instances where the first image was selected in response to the first visual word;

determining a first count, the first count being the sum number of visual words in the historical image queries where the first image was selected, wherein the visual word probability is based at least in part on a ratio of the number of instances and the first count.

4. The method of claim 3, wherein the image ranking function determines the ranking score for each image of the set of image matches by multiplying the respective image action probability by each visual word probability corresponding to a visual word within the set of visual words.

5. A method, comprising:

determining historical action data associated with a plurality of historical image queries, the historical action data indicating an image of a plurality of images having an action logged in response to a particular image query for each of the plurality of historical image queries;

generating an index that maps each image having the action logged in response to the particular image query of the plurality of historical image queries to at least one visual word associated with each historical image query that resulted in the image having the action logged;

receiving an image query;

identifying a set of visual words associated with the image query;

analyzing the index to determine a set of image matches based at least in part on the set of visual words associated with the image query; and determining a portion of the set of image matches for display based at least in part on an image selection probability of each of the set of image matches, wherein the image selection probability for each of the set of image matches is based at least in part on the logged actions for an image and a correspondence between at least one of the set of visual words and a visual word of at least one historical image query that resulted in the image having the action logged.

6. The method of claim 5, further comprising:

determining a first historical image query of the plurality of historical image queries;

determining at least one visual word associated with the first historical image query;

identifying a first image associated with an action in response to the first historical image query of the plurality of image queries; and mapping the first image to each of the at least one visual word associated with the first historical image query.

7. The method of claim 5, wherein the historical action data includes information for at least one of the image being selected in response to the particular image query, the image associated with an item being purchased in response to the image particular query, the image associated with an item being placed in an electronic shopping cart in response to the particular image query, or the image associated with a video being played in response to the particular image query.

8. The method of claim 5, wherein the action includes at least one of a selection of the image, a purchase of an item associated with the image, an item being placed in an electronic shopping cart, and a selection of a video associated with the image.

9. The method of claim 5, wherein analyzing the index to determine a set of image matches based at least in part on the set of visual words associated with the image query further comprises:

searching the index for images of the plurality of images having at least one visual word that matches at least one visual word from the of the set of visual words;

identifying an image action probability associated with each image of the set of matching images, wherein each image action probability is determined based at least in part on the logged actions for an image in response to at least one historical image query; and identifying a visual word probability for each visual word of each image of the set of matching images, each visual word probability determined based at least in part on a historical image query associated with the corresponding visual word of a that resulted in the image having the action logged.

10. The method of claim 9, wherein determining the portion of the set of image matches for display further comprises:

providing, for each of the set of image matches, the respective image action probability and one or more of the respective at least one visual word probabilities matching a visual word in the set of visual words to an image ranking function to determine the image selection probability for each of the set of matching images; and arranging the portion of the set of matching images for display based on the image selection probability for each of the set of matching images.

11. The method of claim 9, wherein identifying a visual word probability comprises identifying a dimension of the visual word in the image, wherein the visual word probability is based at least in part on the dimension.

12. The method of claim 10, wherein the image ranking function determines the image selection probability for each image of the set of image matches by multiplying the respective image action probability by each visual word probability corresponding to a visual word within the set of visual words.

13. The method of claim 9, wherein identifying the image action probability for an image of the plurality of images comprises:

determining a number of instances where the image was associated with the action in response to the plurality of historical image queries; and determining a number of total instances where any of the plurality of images were associated with the action in response to the plurality of historical image queries, wherein the image action probability for the image is based at least in part on a ratio of the number of instances and the total number of instances.

14. The method of claim 9, wherein identifying a visual word probability associated with a first image and a first visual word comprises:

determining a number of instances where the first image was associated with the action in response to the first visual word;

determining a first count, the first count being the sum number of visual words in the historical image queries where the first image was associated with a logged action in response to any of the set of visual words, wherein the
visual word probability is based at least in part on a ratio of the number of instances and the first count.

15. The method of claim 10, further comprising
providing the ranking function with a set of ranking scores from a second ranking process;
determining, using a machine learning algorithm, weighting factors associated with the image action probabilities, visual word probabilities, and the ranking scores from the second ranking process, wherein the image selection probability is determined based at least in part on the weighting factors.

16. A computing device comprising:
a computing device processor;
a memory device including instructions that, when executed by the computing device processor, cause the computing device to:
   determine historical action data associated with a plurality of historical image queries and a plurality of images having an action logged in response to the plurality of historical image queries;
   generate an index that maps each of the plurality of images to at least one visual word associated with a historical image query that resulted in the image having the action logged, the index also mapping each of the plurality of images with a corresponding image action probability, the image action probability of an image based at least in part on thee logged actions for an image;
   receive an image query;
   identify a visual word associated with the image query;
   analyze the index to determine a plurality of matching images based at least in part on the visual word;
   obtain an image action probability and a visual word probability for each of the plurality of matching images, each visual word probability based at least in part on one or more historical image queries mapped to the visual word that resulted in the image having an action logged;
   rank each of the plurality of matching images based at least in part on the image action probability and the visual word probability; and
   cause a portion of the plurality of matching images to be displayed based at least in part on the ranking of each of the plurality of matching images.

17. The computing device of claim 16, wherein the instructions, when executed to rank each of the plurality of matching images cause the computing device to:
   provide the image action probability and the visual word probability for each of the plurality of images to an image ranking function to, the image ranking function used to determine a ranking score for each of the plurality of images, the ranking scores used to arrange a portion of the images for display.

18. The computing device of claim 16, wherein the instructions, when executed cause the computing device to:
   determine a number of instances where an image was associated with a logged action in response to the plurality of image queries;
   determine a number of total instances where any of the plurality of images were associated with a logged action in response to the plurality of image queries,
   wherein the image action probability for the image is based at least in part on a ratio of the number of instances and the number of total instances.

19. The computing device of claim 16, wherein the instructions, when executed cause the computing device to:
   determine a number of instances where a first image was associated with the action in response to a visual word;
   determine a first count, the first count being the sum number of visual words in the historical image queries where the first image was associated with action in response to any of the set of visual words, wherein the
   visual word probability corresponding to the image and the visual word is based at least in part on a ratio of the number of instances and the first count.

20. The method of claim 9, further comprising:
identifying a dimension for each visual word of the set of visual words within in the image query; and
identifying a weighting factor for each of the set of visual words based at least in part on the corresponding dimension, wherein searching the index for images of the plurality of images that match the at least one of the set of visual words is based at least in part on the weighting factors for each of the set of visual words.

* * * * *